United States Patent [19]

Dunbar

[11] Patent Number: 4,837,967
[45] Date of Patent: Jun. 13, 1989

[54] FISH LURE

[76] Inventor: James C. Dunbar, 4397 Hunt Rd., Cincinnati, Ohio 45242

[21] Appl. No.: 292,921

[22] Filed: Jan. 3, 1989

[51] Int. Cl.⁴ ............................................. A01K 85/00
[52] U.S. Cl. ................................................. 43/42.09
[58] Field of Search ................... 43/42.09, 42.1, 42.48, 43/42.31, 42.36, 42.47

[56] References Cited

U.S. PATENT DOCUMENTS

| | | |
|---|---|---|
| 1,472,638 | 10/1923 | Dickman . |
| 1,522,450 | 1/1925 | Hayes ................................. 43/42.48 |
| 1,908,537 | 5/1933 | Pflueger . |
| 2,198,043 | 4/1940 | Scogland et al. .................. 43/42.48 |
| 2,283,960 | 5/1942 | Wade ................................. 43/42.47 |
| 2,295,292 | 9/1942 | Rogers .................................... 43/46 |
| 2,482,466 | 9/1949 | Cooper ............................... 43/42.36 |
| 2,536,553 | 1/1951 | Fleur .................................. 43/42.48 |
| 2,578,411 | 12/1951 | Fisher ................................. 43/42.09 |
| 2,756,535 | 7/1956 | Dean ................................... 43/42.48 |
| 3,877,168 | 4/1975 | Stevens ............................... 43/42.31 |

Primary Examiner—M. Jordan
Attorney, Agent, or Firm—Charles R. Wilson

[57] ABSTRACT

A fish lure having a readily assembled structure is comprised of a buoyant elongated body, a lip with a projecting portion, a one-piece wire member and hooks. The wire member traverses through the body in a generally U-shaped fashion with both ends exiting at a bottom surface of the lure. The wire ends pass through holes in the lip. One wire end is bent back unto itself to form a loop. A second wire end is bent at a substantially right angle and caused to run along the body's bottom surface to the end of the body. The second wire end is bent back onto itself to form a loop with the wire's extremity embedded in the body. Fish hooks are positioned in the loops.

7 Claims, 1 Drawing Sheet

FISH LURE

This invention relates to a fish lure. More particularly. the invention relates to a fish lure with enhanced fish attracting capability and ease of assembly.

BACKGROUND OF INVENTION

Many fish lures of various designs have been developed and used. Of prime importance, a fish lure must be able to attract fish. Certain fish lures have been made where the lure's appearance was felt to be the attracting force. Either unique colorings or shapes were used. Other fish lures have been designed to effect unique water action while being pulled through the water for the purpose of attracting the fish. That is, structural features of the lure which cause the lure to dart in different direction, wobble, bob, etc. have been suggested. Even various sound producing and light producing mechanisms have been proposed to enhance the attracting character of the fish lure. Needless to say, each manufacturer touts his own design as the best.

In addition to attracting fish, a fish lure must be built to withstand repeated uses which can involve substantial forces. Such forces include water surface impacts caused by casting the lure, pull forces encountered with underwater snags, and, of course, forces imparted by a fish when it strikes and is hooked by the lure. Preferably, the lure is easy to assemble because of cost considerations, yet is very durable.

There has now been developed a fish lure which is effective for attracting fish. The lure has enhanced water action when used as well as being capable of adjustment for different desired water depths. The lure's unique design also gives it a relatively snag-free feature. The lure is readily assembled to form a durable article which is in luring fish.

SUMMARY OF THE INVENTION

A fish lure is constructed in a manner which requires relatively easy assembling. The fish lure has a buoyant elongated body with a generally flat bottom surface. The body also has a forward bore and a rearward bore, each extending substantially vertically therethrough. A lateral slot connects the bore at their upper openings. A lip is secured to the body's bottom surface. The lip has a downwardly inclined projecting portion which protrudes forwardly of the body and a main portion which extends along the body. Further, the lip has means to receive a fish line and two holes in the main portion which align with the openings of the bores found in the elongated body. A one piece wire member is bent such that it extends through one hole in the lip, the forward bore, lateral slot, the rearward bore, the second hole in the lip and then extends along the body's bottom surface to its rear extremity. The wire is bent at each of its ends to form loops. Fish hooks are suspended from the loops. The resultant fish lure is easy to assemble and is very durable.

DETAILED DESCRIPTION OF INVENTION

Figure 1:
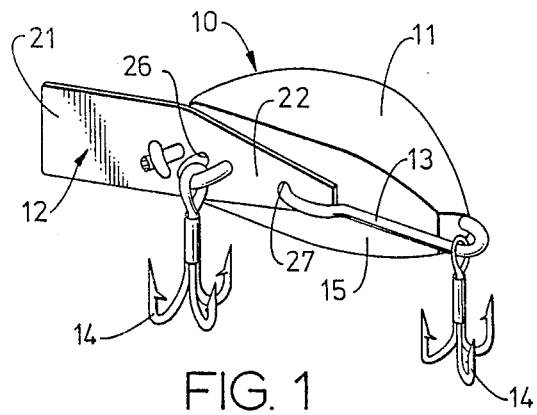
FIG. 1 is a view in perspective of the fish lure of this invention.
Figure 2:
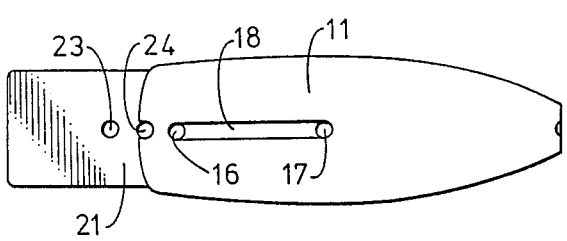
FIG. 2 is a view showing the top surfaces of an elongated body and lip used in making the fish lure of FIG. 1, positioned for assembly.
Figure 3:
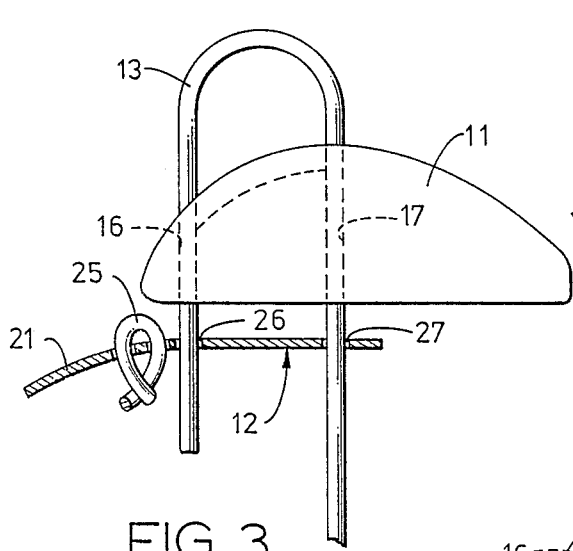
FIGS. 3-5 are side views showing various stages in the assembly of the fish lure of FIG. 1.
Figure 4:
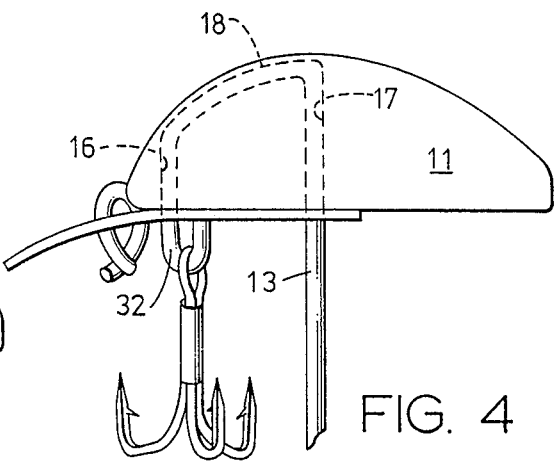
Figure 5:
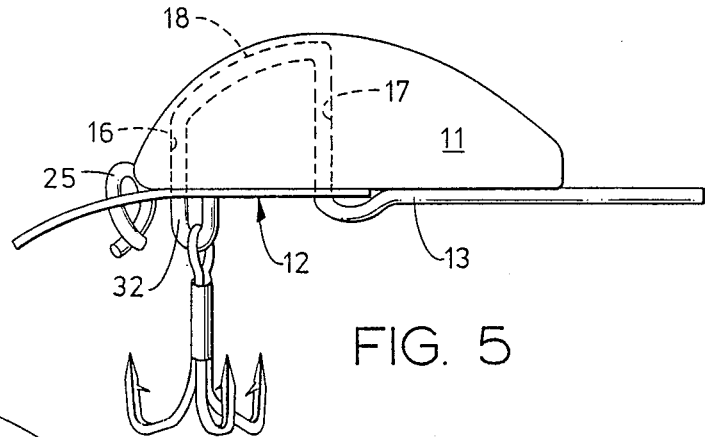

The fish lure of the invention is described with particular reference to the drawings. With reference to FIG. 1, the fish lure 10 comprises an elongated body 11, a lip 12, a one piece wire member 13 and hooks 14. The individual components of the lure and mode of assembly are discussed in detail below.

Figure 6:
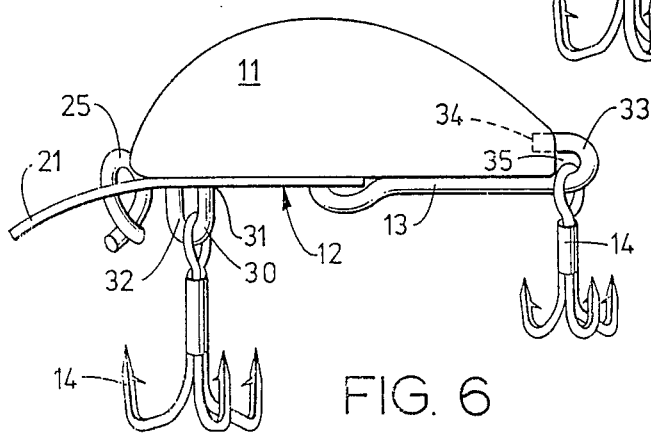
FIG. 6 is a side view of the fish lure of FIG. 1.

Referring to FIGS. 1 and 6, the fish lure 10 has a buoyant elongated body 11. The body 11 has rounded sides with a front face portion sloping forwardly and an endmost portion sloping rearwardly. The shape of the body is not critical, it being only necessary that it be generally round-shaped to move through water without undue water resistance and not have snag-inducing edges. Preferably, the bottom surface 15 of the body is substantially flat to better receive and hold the lip as discussed below. The elongated body is from about one inch to about three inches in length and about one-half inch to about one and one-half inches in width and height, though the exact dimensions are not critical.

Body 11 is made preferably of wood because of cost considerations and ease of manufacture. However, other buoyant materials such as plastic and various cellulose composites can be used.

As best seen in FIGS. 2-5, a forward bore 16 and a rearward bore 17 extend substantially vertically through the mid-section of the elongated body 11 from a point near the body's top surface through the body's bottom surface. Additionally, a lateral slot 18 connects the upper opening of the bore. Slot 18 is cut into the body prior to insertion of the wire or is actually created in the body by exerting a substantial downward face on the lower wire portion during assembly as disscussed below.

Secured to the bottom surface 15 of the elongated body and projecting forwardly is lip 12. The lip extends longitudinally along the bottom surface with a projecting portion 21 extending past the body's leading edge. This portion of the lip is downwardly inclined, preferably at an about ten degree to about forty-five degree angle from the horizontal. A main portion 22 of the lip is dimensioned to be secured to the body's flat bottom surface and fit within its peripheral edges. Thus the shape and dimensions of the lip are dependent upon the lure body to which it will be secured. As seen FIG. 1, the lip is generally a rectangular shaped item which tapers toward the rear. It is necessary that the lip not be so heavy as to cause the lure to sink during use. A lip made of thin metal is preferred because the buoyant nature of the lure is retained, yet the metal lowers the lure's center of gravity. The later feature is desired when the lure is used in swift moving water to keep the lure from overturning.

A pair of closely spaced holes 23 and 24 are provided in the projecting portion 21 of the lip. These holes provide an attachment means by which a fish line can be directly attached. Preferably, an eyelet 25 is provided in the holes to which the fish line is more readily attached. Holes 26 and 27 are provided in the main portion of the lip to align with the opening of the forward bore and rearward bore found on the bottom surface 15 of the elongated body.

A one piece wire member 13 passes through the lip in two locations, traverses through the elongated body 11 and runs alongside the body's bottom surface. As seen best in FIGS. 3-5, wire 13 extends upwardly through hole 26 in lip 12 and through forward bore 16. It then follows lateral slot 18 to rearward bore 17 and downwardly through an opening in the body's bottom surface. The wire passes through hole 27 in the lip and then along the body's bottom surface 15 to the body's rear extremity. Thus the wire member has a generally inverted U-shape while traversing through the elongated body.

A first end 30 of wire member 13 is bent back unto itself to form a loop 32 with wire extremity 31 abutting against the lip. Wire end 33 is also bent back unto itself to form a loop 35 with extremity 34 embedded in the body 11. The loops 32 and 35 are primarily used to hold fish hooks. However, their manner of formation enhances the structural strength and durability of the fish lure.

Treble hooks 14 are inserted into the loops before they are forced close. Preferably the forward treble hook is larger than the rearwrd treble hook to obtain better water movement during use. Other fish hooks can as well be used, though the treble hooks are conventionally used for this type of fish lure and are preferred here as well.

The fish lure of the invention is readily assembled. Preferably, two holes are drilled substantially vertically through the lure's elongated body. Next, a piece of properly gauged wire is bent in a generally U-shape with each end forced down through the two holes in the body. A lip with holes pre-drilled to align with those in the body is positioned on the bottom of the lure. The ends of the U-shaped wire are forced to pass through the holes in the lip. The mid-leg of the invented U-shaped wire is forced into the body by exerting sufficient downward forces on the wire member to create a lateral slot. Next, a first end is cut and bent back so as to abut against the bottom of the lip. This first end is straightened, a hook inserted, and then re-bent to form a loop so that its extremity abuts up against the lip. As such the hook is secured and the bent wire helps to hold the lip in place. The second end of the U-shaped wire is bent at a substantially right angle to pass backwardly along the bottom of the elongated body to its end. The wire end is bent back unto itself, a hook inserted, the wire re-bent and the wire's extremity embedded in the body. Filling of the lateral slot and body area where the second end of the wire enters with wood putty or other appropriate material is accomplished primarily for aesthetic purposes.

The resultant fish lure is used by attaching a fish line to the lure's attachment means on the lip. The lure floats when setting still in the water. However, when pulled through the water, it will tend to dip below the water's surface because of the angled lip. The forwardly projecting lip is bent to any desired angle to effect different water depths as desired by the fisherman. Routine experimentation will determine the best lip anlge for the water depth desired. The ability to readily adjust the lure's water depth during use in this manner adds to the versatility and desirability of the lure. The shape of the lure itself tends to cause it to travel through the water in a nose down side to side manner. This effectively lessens the chance for a hook, to snag an underwater object.

As apparent, the fish lure of the invention is durable due to its body and lip member and the manner in which the one piece wire member traverses through the body and ties all the members together. The lure is in effect unity in structure and therefore very durable.

While the invention has been described with reference to the drawings, other variations are possible. All obvious modifications are within the scope of the appended claims.

What is claimed is:

1. A fish lure having a readily assembled unitary structure, further characterized in having enhanced water action with reduced hook hang-up, said lure comprising:
    (a) a buoyant elongated body having a generally flat bottom surface with a forward bore and a rearward bore, each extending substantially vertically through a mid-section of the body and opening at the bottom surface and a lateral slot connecting said bores near a top surface of the body;
    (b) a lip longitudinally extending along the bottom surface of the elongated body, said lip having a downwardly inclined projecting portion which protrudes forwardly of the body and a main portion which is dimensioned to be secured to the bottom surface of the lure to fit within the bottom surface's peripheral edges, said lip further characterized in having means in the inclined projecting portion to receive a fish line and two holes in the main portion, each of said two holes being positioned to be in alignment with the bore openings found in the body;
    (c) a one piece wire member, wherein a portion of said wire member is bent in a generally U-shape such that one leg of the U-shape wire passes through the forward bore with a first end of the one piece wire member extending out the bore opening and through one hole in the main portion of the lip and bent back unto itself to form a loop, a mid-leg of the U-shaped wire positioned in the lateral slot, and a second leg of the U-shaped wire passes through he rearward bore and extends out the bore opening and through a second hole in the main portion of the lip, further wherein the remaining portion of the one piece wire member is bent to be substantially parallel with the elongated body's bottom surface and extends rearwardly to a rear extremity of the body whereupon the wire members second end is bent back unto itself to form a loop with the extremity of the second end embedded in the body; and
    (d) at least two fish hooks, with one hook attached to the first loop formed by the first end of the wire member and a second hook attached to the second loop formed by the second end of the wire member.

2. The fish lure of claim 1 wherein the elongated body has a front face which slopes forwardly.

3. The fish lure of claim 2 wherein the elongated body has generally rounded side and top portions.

4. The fish lure of claim 3 wherein the projecting portion of the lip has two holes through it and an eyelet passes through the holes to form the means to receive said fish line.

5. The fish lure of claim 4 wherein the lip is made of a metal which is capable of bending so as to achieve desired water action and water depth when the fish lure is pulled through water.

6. The fish lure of claim 5 wherein each of the fish hooks is a treble hook.

7. The fish lure of claim 4 wherein the elongated body is made of wood and the lip is made of metal.

* * * * *